(12) United States Patent
Fattal

(10) Patent No.: US 11,194,086 B2
(45) Date of Patent: Dec. 7, 2021

(54) THREE-DIMENSIONAL (3D) ELECTRONIC DISPLAY

(71) Applicant: LEIA INC., Menlo Park, CA (US)

(72) Inventor: David A. Fattal, Mountain View, CA (US)

(73) Assignee: LEIA INC., Menlo Park, CA (US)

( * ) Notice: Subject to any disclaimer, the term of this patent is extended or adjusted under 35 U.S.C. 154(b) by 587 days.

(21) Appl. No.: 15/665,256

(22) Filed: Jul. 31, 2017

(65) Prior Publication Data
US 2018/0011237 A1 Jan. 11, 2018

Related U.S. Application Data

(63) Continuation of application No. PCT/US2015/015972, filed on Feb. 13, 2015.
(Continued)

(51) Int. Cl.
F21V 8/00 (2006.01)
G02B 5/18 (2006.01)
(Continued)

(52) U.S. Cl.
CPC ............ *G02B 6/0035* (2013.01); *G02B 5/18* (2013.01); *G02B 5/1866* (2013.01);
(Continued)

(58) Field of Classification Search
CPC ...... G02B 6/0035; G02B 6/00; G02B 5/1866; G02B 27/2214; G02B 27/2221;
(Continued)

(56) References Cited

U.S. PATENT DOCUMENTS 5,615,024 A 3/1997 May et al.
5,617,248 A 4/1997 Takahashi et al.
(Continued)

FOREIGN PATENT DOCUMENTS

CN 1213097 A 4/1999
CN 1619373 A 5/2005
(Continued)

OTHER PUBLICATIONS

International Search Report (ISR), 3 pages, from KIPO (ISA/KR), dated Oct. 19, 2015, for counterpart parent PCT patent application No. PCTUS2015015972.
(Continued)

*Primary Examiner* — Joseph G Ustaris
*Assistant Examiner* — Jimmy S Lee
(74) *Attorney, Agent, or Firm* — J. Michael Johnson

(57) ABSTRACT

Three-dimensional (3D) electronic displays provide different 3D views and employ one or both of an array of multibeam diffraction gratings arranged in offset rows and light valves having color filters. The displays include a plate light guide configured to guide light beams at a non-zero propagation angle, a multibeam diffraction grating configured to couple out a portion of the guided light beams as a plurality of light beams having different principal angular directions representing the different 3D views, and light valves configured to modulate the differently directed, coupled-out light beams. The multibeam diffraction grating may be a member of the array arranged in offset rows and the display may further include light valves having color filters. Alternately, the light valves include color filters and the display may further include the array of multibeam diffraction gratings arranged in offset rows.

13 Claims, 4 Drawing Sheets

Related U.S. Application Data

(60) Provisional application No. 62/109,040, filed on Jan. 28, 2015.

(51) Int. Cl.

| | | |
|---|---|---|
| *G02B 30/27* | (2020.01) | |
| *G02B 30/40* | (2020.01) | |
| *H04N 13/315* | (2018.01) | |
| *H04N 13/324* | (2018.01) | |
| *G02B 27/42* | (2006.01) | |
| *G02F 1/1335* | (2006.01) | |

(52) U.S. Cl.
CPC ....... *G02B 6/0038* (2013.01); *G02B 27/4205* (2013.01); *G02B 30/27* (2020.01); *G02B 30/40* (2020.01); *G02F 1/133514* (2013.01); *H04N 13/315* (2018.05); *H04N 13/324* (2018.05)

(58) Field of Classification Search
CPC .......... G02B 27/4205; G02F 1/133514; H04N 13/315; H04N 13/324
USPC .......................................................... 348/56
See application file for complete search history.

(56) References Cited

U.S. PATENT DOCUMENTS

| | | | |
|---|---|---|---|
| 5,721,598 A | 2/1998 | Smith | |
| 5,729,311 A | 3/1998 | Broer et al. | |
| 5,926,294 A | 7/1999 | Sato et al. | |
| 6,580,529 B1 | 6/2003 | Amitai et al. | |
| 6,667,819 B2 | 12/2003 | Nishikawa et al. | |
| 6,980,271 B2 | 12/2005 | Fujishiro | |
| 7,114,820 B1 | 10/2006 | Parikka et al. | |
| 7,742,120 B2 | 6/2010 | Bayley et al. | |
| 7,773,849 B2 | 8/2010 | Shani | |
| 7,903,332 B2 | 3/2011 | De Zwart et al. | |
| 8,026,997 B2 | 9/2011 | Feng | |
| 8,251,563 B2 | 8/2012 | Papakonstantinou et al. | |
| 8,619,363 B1 | 12/2013 | Coleman | |
| 8,681,423 B1* | 3/2014 | Gibson ................ | G02B 6/0035 349/196 |
| 9,128,226 B2 | 9/2015 | Fattal et al. | |
| 9,201,270 B2 | 12/2015 | Fattal et al. | |
| 9,298,168 B2 | 3/2016 | Taff et al. | |
| 9,389,415 B2 | 7/2016 | Fattal et al. | |
| 9,459,461 B2 | 10/2016 | Santori et al. | |
| 9,557,466 B2 | 1/2017 | Fattal | |
| 2002/0008834 A1 | 1/2002 | Suzuki | |
| 2002/0018151 A1 | 2/2002 | Suzuki et al. | |
| 2002/0075445 A1 | 6/2002 | Dabrowski et al. | |
| 2003/0086649 A1 | 5/2003 | Zhou | |
| 2004/0119896 A1* | 6/2004 | Kean ................... | H04N 13/305 349/25 |
| 2004/0130879 A1 | 7/2004 | Choi et al. | |
| 2004/0156182 A1 | 8/2004 | Hatjasalo et al. | |
| 2004/0156589 A1 | 8/2004 | Gunn et al. | |
| 2004/0174389 A1* | 9/2004 | Ben-David .............. | G09G 5/02 345/694 |
| 2005/0007757 A1 | 1/2005 | Leu et al. | |
| 2005/0041174 A1 | 2/2005 | Numata et al. | |
| 2005/0073627 A1 | 4/2005 | Akiyama | |
| 2005/0123229 A1 | 6/2005 | Huck et al. | |
| 2005/0140832 A1 | 6/2005 | Goldman et al. | |
| 2005/0201122 A1 | 9/2005 | Shinohara et al. | |
| 2005/0264717 A1 | 12/2005 | Chien et al. | |
| 2006/0008347 A1 | 4/2006 | Winkler | |
| 2006/0104570 A1 | 5/2006 | Rausch | |
| 2007/0058394 A1 | 3/2007 | Yu | |
| 2007/0129864 A1 | 6/2007 | Tanaka et al. | |
| 2007/0213955 A1 | 9/2007 | Ishida et al. | |
| 2007/0279367 A1 | 12/2007 | Kitai | |
| 2007/0298533 A1 | 12/2007 | Fang et al. | |
| 2008/0204663 A1 | 8/2008 | Balogh | |
| 2008/0204873 A1 | 8/2008 | Daniell | |
| 2008/0225393 A1 | 9/2008 | Rinko | |
| 2008/0285307 A1 | 11/2008 | Aylward et al. | |
| 2008/0297696 A1 | 12/2008 | Banerjee | |
| 2009/0091837 A1 | 4/2009 | Chao et al. | |
| 2009/0129116 A1 | 5/2009 | Kim et al. | |
| 2009/0207342 A1 | 8/2009 | Yamaguchi et al. | |
| 2009/0213300 A1 | 8/2009 | Daiku | |
| 2009/0244706 A1 | 10/2009 | Levola et al. | |
| 2009/0290837 A1 | 11/2009 | Chen et al. | |
| 2009/0322986 A1 | 12/2009 | Wei et al. | |
| 2010/0039832 A1 | 2/2010 | Ahlgren et al. | |
| 2010/0103485 A1 | 4/2010 | Haussler | |
| 2010/0118117 A1 | 5/2010 | Kroll et al. | |
| 2010/0123952 A1 | 5/2010 | Chen et al. | |
| 2010/0207964 A1 | 8/2010 | Kimmel et al. | |
| 2010/0245718 A1* | 9/2010 | Nishino ............ | G02F 1/133514 349/65 |
| 2010/0246764 A1 | 9/2010 | Itoh et al. | |
| 2010/0284085 A1 | 11/2010 | Laakkonen | |
| 2010/0289870 A1 | 11/2010 | Leister | |
| 2010/0302803 A1 | 12/2010 | Bita et al. | |
| 2010/0321781 A1 | 12/2010 | Levola et al. | |
| 2011/0002143 A1 | 1/2011 | Saarikko et al. | |
| 2011/0019258 A1* | 1/2011 | Levola ................ | G02B 6/0035 359/238 |
| 2011/0141395 A1* | 6/2011 | Yashiro ................ | G02B 6/0036 349/62 |
| 2011/0149596 A1 | 6/2011 | Lv et al. | |
| 2011/0157257 A1* | 6/2011 | Bennett ................ | H04N 13/194 345/690 |
| 2011/0157667 A1 | 6/2011 | Lacoste et al. | |
| 2011/0182570 A1 | 7/2011 | Yeh | |
| 2011/0241573 A1 | 10/2011 | Tsai et al. | |
| 2011/0254916 A1 | 10/2011 | Fan et al. | |
| 2011/0304784 A1 | 12/2011 | Hirota et al. | |
| 2012/0008067 A1 | 1/2012 | Mun et al. | |
| 2012/0013962 A1 | 1/2012 | Subbaraman et al. | |
| 2012/0075698 A1* | 3/2012 | Minami ................ | G02B 6/0043 359/462 |
| 2012/0113678 A1 | 5/2012 | Cornelissen et al. | |
| 2012/0120213 A1 | 5/2012 | Ohyama et al. | |
| 2012/0127547 A1 | 5/2012 | Gocho et al. | |
| 2012/0127573 A1 | 5/2012 | Robinson et al. | |
| 2012/0127751 A1 | 5/2012 | Kimmel | |
| 2012/0176665 A1 | 7/2012 | Song et al. | |
| 2012/0249934 A1 | 10/2012 | Li et al. | |
| 2012/0250141 A1 | 10/2012 | Chen | |
| 2013/0001193 A1* | 1/2013 | Gabor ...................... | G03F 1/42 216/41 |
| 2013/0057539 A1 | 3/2013 | Kim | |
| 2013/0082980 A1 | 4/2013 | Gruhlke et al. | |
| 2013/0155477 A1 | 6/2013 | Yankov et al. | |
| 2013/0201723 A1 | 8/2013 | Gourlay | |
| 2014/0111856 A1 | 4/2014 | Brug et al. | |
| 2015/0146132 A1* | 5/2015 | Katsuta ................ | G02B 6/0053 349/61 |
| 2015/0185957 A1* | 7/2015 | Weng ..................... | G02B 30/27 345/175 |
| 2015/0355403 A1 | 12/2015 | Santori et al. | |
| 2016/0018582 A1 | 1/2016 | Fiorentino et al. | |
| 2017/0090096 A1 | 3/2017 | Fattal | |

FOREIGN PATENT DOCUMENTS

| | | |
|---|---|---|
| CN | 101750664 A | 6/2010 |
| CN | 101799589 A | 8/2010 |
| CN | 102207424 A | 10/2011 |
| CN | 202126538 | 1/2012 |
| CN | 202720346 U | 2/2013 |
| JP | H06148635 A | 5/1994 |
| JP | H08190095 A | 7/1996 |
| JP | H09265085 A | 10/1997 |
| JP | 2000267041 A | 9/2000 |
| JP | 2002031788 A | 1/2002 |
| JP | 2004077897 A | 3/2004 |
| JP | 2004302186 A | 10/2004 |

(56) References Cited

FOREIGN PATENT DOCUMENTS

| JP | 2008083532 A | 4/2008 |
|---|---|---|
| JP | 2008164963 A | 7/2008 |
| JP | 2009053499 A | 3/2009 |
| JP | 2009288718 A | 12/2009 |
| JP | 2010102188 A | 5/2010 |
| JP | 2010237416 A | 10/2010 |
| JP | 2011029161 A | 2/2011 |
| JP | 2011133677 A | 7/2011 |
| JP | 2011232717 A | 11/2011 |
| JP | 2012022085 A | 2/2012 |
| WO | 9908257 A1 | 2/1999 |
| WO | 2012069071 A1 | 5/2012 |
| WO | 2014081415 A1 | 5/2014 |

OTHER PUBLICATIONS

Travis et al., "Collimated light from a waveguide for a display backlight," Optics Express, Oct. 2009, pp. 19714-19719, vol. 17, No. 22.

Xu et al., "Computer-Generated Holography for Dynamic Display of 3D Objects with Full Parallax," International Journal of Virtual Reality, 2009, pp. 33-38, vol. 8, No. 2.

Fattal, David et al., "A multi-directional backlight for a wide-angle, glasses-free three-dimensional display," Nature, Mar. 21, 2013, pp. 348-351, vol. 495, Macmillan Publishers Limited, 2013.

Son, Jung-Young et al., "Three-Dimensional Imaging Methods Based on Multiview Images," IEEE/OSA Journal of Display Technology, Sep. 2005, pp. 125-140, vol. 1, No. 1.

Kee, Edwin., "Hitachi Full Parallax 3D Display Offers Mind Bending Visuals," http://www.ubergizmo.com/2011/10/hitachi-full-parallax-3d-display-offers-mind-bending-visuals, Oct. 4, 2011, 2 pages.

Reichelt et al., "Holographic 3-D Displays—Electro-holography within the Grasp of Commercialization," Advances in Lasers and Electro-Optics, Optics, Nelson Costa and Adolfo Cartaxo (Ed.), (2010), pp. 683-711, ISBN: 978-953-307-088-9, InTech, Available from: http://www.intechopen.com/books/advances-in-lasers-and-electro-optics/holographic-3-ddisplays-electro-holography-within-the-grasp-of-commercialization.

\* cited by examiner

THREE-DIMENSIONAL (3D) ELECTRONIC DISPLAY

CROSS-REFERENCE TO RELATED APPLICATIONS

This application is a continuation application of and claims the benefit of priority to prior International Application No. PCT/US2015/015972, filed Feb. 13, 2015, which claims the benefit of priority to prior U.S. Provisional Application No. 62/109,040, filed Jan. 28, 2015, the entire contents of both are incorporated herein by reference.

STATEMENT REGARDING FEDERALLY SPONSORED RESEARCH OR DEVELOPMENT

N/A

BACKGROUND

Electronic displays are a nearly ubiquitous medium for communicating information to users of a wide variety of devices and products. Among the most commonly found electronic displays are the cathode ray tube (CRT), plasma display panels (PDP), liquid crystal displays (LCD), electroluminescent displays (EL), organic light emitting diode (OLED) and active matrix OLEDs (AMOLED) displays, electrophoretic displays (EP) and various displays that employ electromechanical or electrofluidic light modulation (e.g., digital micromirror devices, electrowetting displays, etc.). In general, electronic displays may be categorized as either active displays (i.e., displays that emit light) or passive displays (i.e., displays that modulate light provided by another source). Among the most evident examples of active displays are CRTs, PDPs and OLEDs/AMOLEDs. Displays that are typically classified as passive when considering emitted light are LCDs and EP displays. Passive displays, while often exhibiting attractive performance characteristics including, but not limited to, inherently low power consumption, may find somewhat limited use in many practical applications given the lack of an ability to emit light.

To overcome the limitations of passive displays associated with emitted light, many passive displays are coupled to an external light source. The coupled light source may allow these otherwise passive displays to emit light and function substantially as an active display. Examples of such coupled light sources are backlights. Backlights are light sources (often panel light sources) that are placed behind an otherwise passive display to illuminate the passive display. For example, a backlight may be coupled to an LCD or an EP display. The backlight emits light that passes through the LCD or the EP display. The light emitted is modulated by the LCD or the EP display and the modulated light is then emitted, in turn, from the LCD or the EP display. Often backlights are configured to emit white light. Color filters are then used to transform the white light into various colors used in the display. The color filters may be placed at an output of the LCD or the EP display (less common) or between the backlight and the LCD or the EP display, for example.

BRIEF DESCRIPTION OF THE DRAWINGS

Various features of examples and embodiments in accordance with the principles described herein may be more readily understood with reference to the following detailed description taken in conjunction with the accompanying drawings, where like reference numerals designate like structural elements, and in which.

Figure 1A:
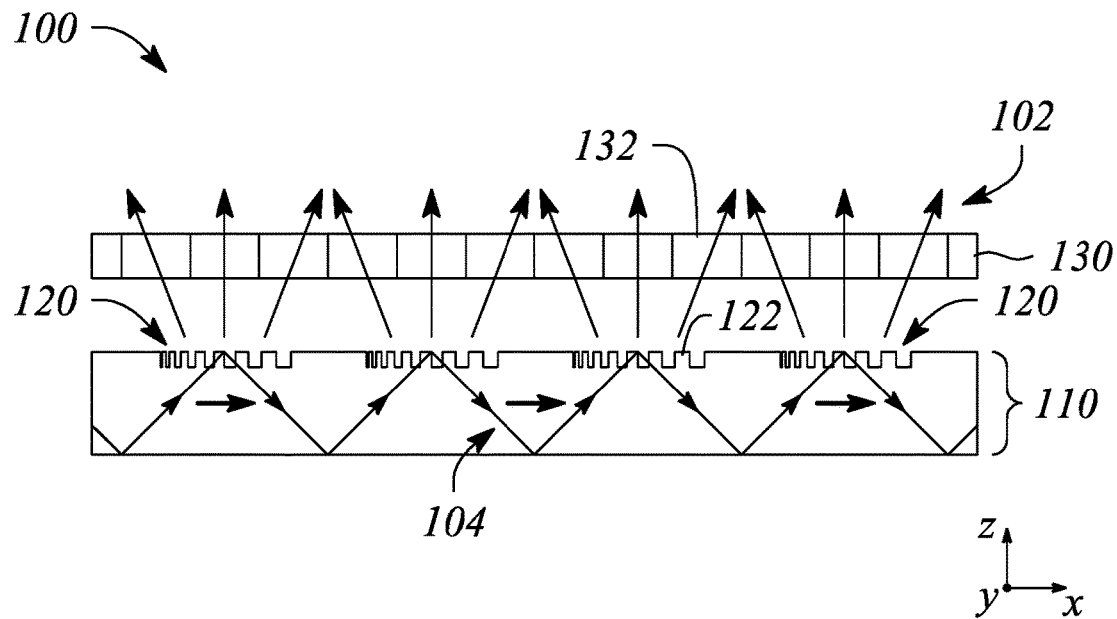
FIG. 1A illustrates a cross sectional view of a three-dimensional (3D) electronic display in an example, according to an embodiment consistent with the principles described herein.

Certain examples and embodiments have other features that are one of in addition to and in lieu of the features illustrated in the above-referenced figures. These and other features are detailed below with reference to the above-referenced figures.

DETAILED DESCRIPTION

Embodiments in accordance with the principles described herein provide for the display of three-dimensional (3D) data. In accordance with some embodiments of the principles described herein, a three-dimensional (3D) electronic display having enhanced perceived resolution is provided. In other embodiments, a 3D color electronic display is provided that employs color filter-equipped light valves to facilitate spatially multiplexed color rendition of 3D information. The 3D electronic display (both monochromatic and color) provided by various embodiments described herein may be employed to present images and information in conjunction with a so-called 'glasses-free' or autostereoscopic display system.

Herein, a 'light guide' is defined as a structure that guides light within the structure using total internal reflection. In particular, the light guide may include a core that is substantially transparent at an operational wavelength of the light guide. In various examples, the term 'light guide' generally refers to a dielectric optical waveguide that employs total internal reflection to guide light at an interface between a dielectric material of the light guide and a material or medium that surrounds that light guide. By definition, a condition for total internal reflection is that a refractive index of the light guide is greater than a refractive index of a surrounding medium adjacent to a surface of the light guide material. In some examples, the light guide may include a coating in addition to or instead of the aforementioned refractive index difference to further facilitate the total internal reflection. The coating may be a reflective coating, for example. According to various examples, the light guide may be any of several light guides including, but not limited to, one or both of a plate or slab guide and a strip guide.

Further herein, the term 'plate' when applied to a light guide as in a 'plate light guide' is defined as a piece-wise or differentially planar layer or sheet (i.e., a slab). In particular, a plate light guide is defined as a light guide configured to guide light in two substantially orthogonal directions bounded by a top surface and a bottom surface (i.e., opposite surfaces) of the light guide. Further, by definition herein, the top and bottom surfaces are both separated from one another and may be substantially parallel to one another in at least a differential sense. That is, within any differentially small region of the plate light guide, the top and bottom surfaces are substantially parallel or co-planar. In some examples, a plate light guide may be substantially flat (e.g., confined to a plane) and so the plate light guide is a planar light guide. In other examples, the plate light guide may be curved in one or two orthogonal dimensions. For example, the plate light guide may be curved in a single dimension to form a cylindrical shaped plate light guide. In various examples however, any curvature has a radius of curvature sufficiently large to insure that total internal reflection is maintained within the plate light guide to guide light.

According to various examples described herein, a diffraction grating (e.g., a multibeam diffraction grating) is employed to scatter or couple light out of a plate light guide. Herein, a 'diffraction grating' is generally defined as a plurality of features (i.e., diffractive features) arranged to provide diffraction of light incident on the diffraction grating. In some examples, the plurality of features may be arranged in a periodic or quasi-periodic manner. For example, the diffraction grating may include a plurality of features (e.g., a plurality of grooves in a material surface) arranged in a one-dimensional (1-D) array. In other examples, the diffraction grating may be a two-dimensional (2-D) array of features. The diffraction grating may be a 2-D array of bumps on or holes in a material surface, for example.

As such, and by definition herein, the 'diffraction grating' is a structure that provides diffraction of light incident on the diffraction grating. If the light is incident on the diffraction grating from a light guide, the provided diffraction or diffractive scattering may result in, and thus be referred to as, 'diffractive coupling' in that the diffraction grating may couple light out of the light guide by diffraction. The diffraction grating also redirects or changes an angle of the light by diffraction (i.e., a diffractive angle). In particular, as a result of diffraction, light leaving the diffraction grating (i.e., diffracted light) generally has a different propagation direction than a propagation direction of the light incident on the diffraction grating (i.e., incident light). The change in the propagation direction of the light by diffraction is referred to as 'diffractive redirection' herein. Hence, the diffraction grating may be understood to be a structure including diffractive features that diffractively redirects light incident on the diffraction grating and, if the light is incident from a light guide, the diffraction grating may also diffractively couple out the light from light guide.

Further, by definition herein, the features of a diffraction grating are referred to as 'diffractive features' and may be one or more of at, in and on a surface (e.g., a boundary between two materials). The surface may be a surface of a plate light guide, for example. The diffractive features may include any of a variety of structures that diffract light including, but not limited to, one or more of grooves, ridges, holes and bumps at, in or on the surface. For example, the diffraction grating may include a plurality of parallel grooves in the material surface. In another example, the diffraction grating may include a plurality of parallel ridges rising out of the material surface. The diffractive features (e.g., grooves, ridges, holes, bumps, etc.) may have any of a variety of cross sectional shapes or profiles that provide diffraction including, but not limited to, one or more of a sinusoidal profile, a rectangular profile (e.g., a binary diffraction grating), a triangular profile and a saw tooth profile (e.g., a blazed grating).

By definition herein, a 'multibeam diffraction grating' is a diffraction grating that produces diffractively redirected or coupled-out light that includes a plurality of light beams. Further, the light beams of the plurality produced by the multibeam diffraction grating have different principal angular directions from one another, by definition herein. In particular, by definition, a light beam of the plurality has a predetermined principal angular direction that is different from another light beam of the light beam plurality as a result of diffractive coupling and diffractive redirection of incident light by the multibeam diffraction grating. For example, the light beam plurality may include eight light beams that have eight different principal angular directions. The eight light beams in combination (i.e., the light beam plurality) may represent a light field, for example. According to various examples, the different principal angular directions of the various light beams are determined by a combination of a pitch or spacing and an orientation or rotation of the diffractive features of the multibeam diffraction grating at the points of origin of the respective light beams relative to a propagation direction of the light incident on the multibeam diffraction grating.

According to various examples described herein, a multibeam diffraction grating is employed to couple light out of the plate light guide, e.g., as pixels of an electronic display. In particular, the plate light guide having a multibeam diffraction grating to produce light beams of the plurality having different angular directions may be part of a backlight of or used in conjunction with an electronic display such as, but not limited to, a 'glasses free' three-dimensional (3D) electronic display (e.g., also referred to as a multiview or 'holographic' electronic display or an autostereoscopic display). As such, the differently directed light beams produced by coupling out guided light from the light guide using the multibeam diffractive gratings may be or represent 'pixels' of the 3D electronic display.

Herein, a 'light source' is defined as a source of light (e.g., an apparatus or device that produces and emits light). For example, the light source may be a light emitting diode (LED) that emits light when activated. Herein, a light source may be substantially any source of light or optical emitter including, but not limited to, one or more of a light emitting diode (LED), a laser, an organic light emitting diode (OLED), a polymer light emitting diode, a plasma-based optical emitter, a fluorescent lamp, an incandescent lamp, and virtually any other source of light. The light produced by the light source may have a color (i.e., may include a particular wavelength of light), or may be a range of wavelengths. In particular, light sources or optical emitters of different colors may produce substantially monochromatic light at different wavelengths from one another, by definition herein.

Further, as used herein, the article 'a' is intended to have its ordinary meaning in the patent arts, namely 'one or more'. For example, 'a grating' means one or more gratings and as such, 'the grating' means 'the grating(s)' herein. Also, any reference herein to 'top', 'bottom', 'upper', 'lower', 'up', 'down', 'front', back', 'first', 'second', 'left' or 'right' is not intended to be a limitation herein. Herein, the term 'about' when applied to a value generally means within the tolerance range of the equipment used to produce the value, or in some examples, means plus or minus 10%, or plus or minus 5%, or plus or minus 1%, unless otherwise expressly specified. Further, the term 'substantially' as used herein means a majority, or almost all, or all, or an amount within a range of about 51% to about 100%, for example. Moreover, examples herein are intended to be illustrative only and are presented for discussion purposes and not by way of limitation.

Figure 1B:
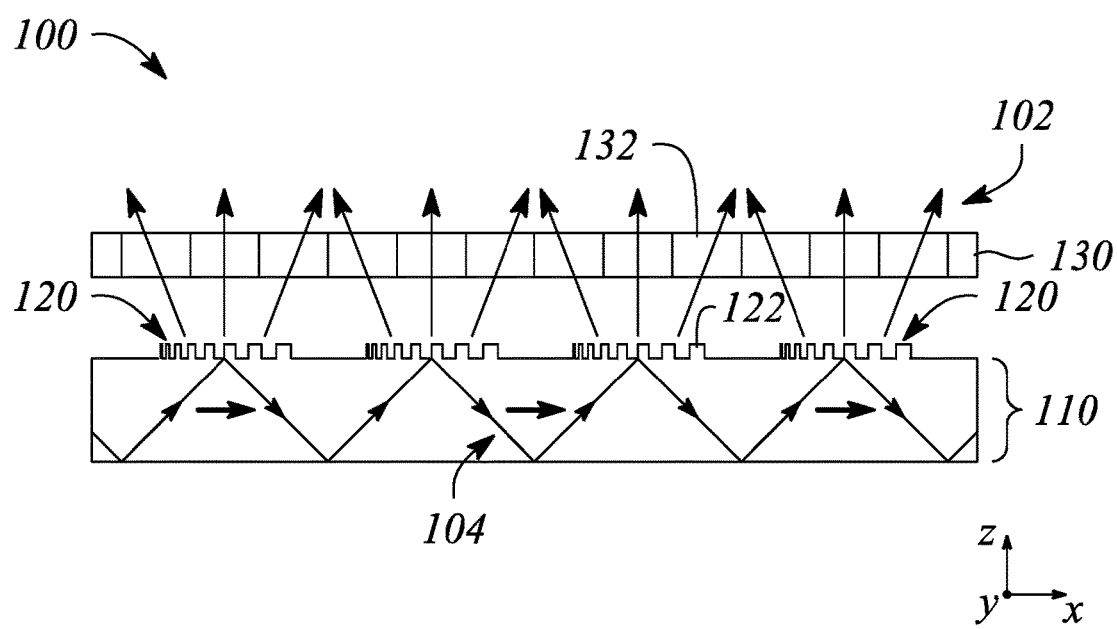
FIG. 1B illustrates a cross sectional view of a three-dimensional (3D) electronic display in an example, according to another embodiment consistent with the principles described herein.
Figure 1C:
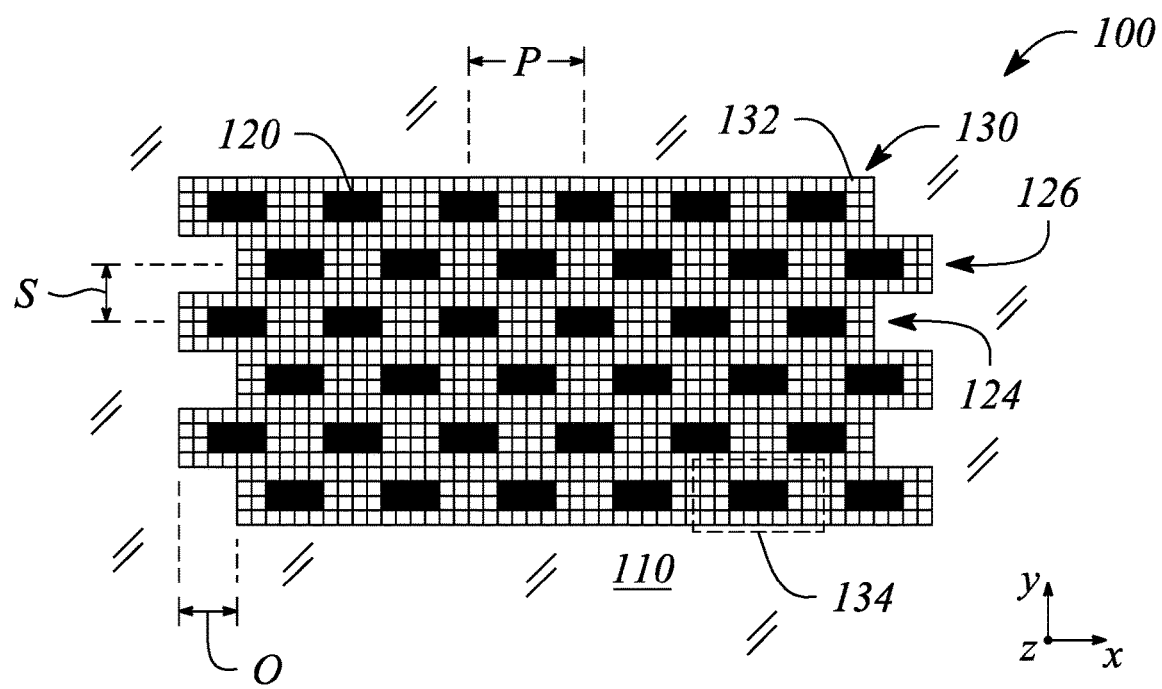
FIG. 1C illustrates a plan view of a three-dimensional (3D) electronic display in an example, according to an embodiment consistent with the principles described herein.

In accordance with various embodiments of the principles described herein, a three-dimensional (3D) electronic display is provided. FIG. 1A illustrates a cross sectional view of a three-dimensional (3D) electronic display 100 in an example, according to an embodiment consistent with the principles described herein. FIG. 1B illustrates a cross sectional view of a three-dimensional (3D) electronic display 100 in an example, according to another embodiment consistent with the principles described herein. FIG. 1C illustrates a plan view of a three-dimensional (3D) electronic display 100 in an example, according to an embodiment consistent with the principles described herein. For example, the 3D electronic display 100 illustrated in FIG. 1C may represent the 3D electronic display 100 illustrated in either of FIG. 1A or FIG. 1B. According to various embodiments, the 3D electronic display 100 may provide enhanced perceived resolution (e.g., as opposed to physical or actual resolution) for the representation or display of 3D information.

In particular, the 3D electronic display 100 is configured to produce modulated, 'directional' light, i.e., light comprising light beams having different principal angular directions. For example, as illustrated in FIGS. 1A and 1B, the 3D electronic display 100 may provide or generate a plurality of light beams 102 directed out and away from the 3D electronic display 100 in different predetermined principal angular directions (e.g., as a light field). In turn, the light beams 102 of the plurality may be modulated to facilitate the display of information having 3D content. In some examples, the modulated light beams 102 having different predetermined principal angular directions form a plurality of pixels of the 3D electronic display 100. Further, the 3D electronic display 100 may be a so-called 'glasses free' 3D electronic display (e.g., a multiview, 'holographic' or autostereoscopic display) in which the light beams 102 correspond to pixels associated with different 'views' of the 3D electronic display 100. According to various embodiments, the perception of a resolution of the displayed 3D information may be enhanced relative to a native 'pixel resolution' of the plurality of pixels of the 3D electronic display 100.

According to various examples, the light beams 102 may form a light field in a viewing direction of the 3D electronic display 100. A light beam 102 of the plurality of light beams 102 (and within the light field) may be configured to have a different principal angular direction from other light beams 102 of the plurality, according to some embodiments. Further, in addition to the light beam 102 having a predetermined direction or principal angular direction, the light beam 102 may have a relatively narrow angular spread within the light field, according to various embodiments. As such, the principal angular direction of the light beam 102 may correspond to an angular direction of a particular view of the 3D electronic display 100. Moreover, the light beam 102, and more particularly the light beam 102 after being modulated, may represent or correspond to a pixel (e.g., a dynamic pixel) of the 3D electronic display 100 corresponding to the particular view direction, according to some embodiments.

As illustrated in FIGS. 1A, 1B and 1C, the 3D electronic display 100 comprises a light guide 110. In particular, the light guide 110 may be a plate light guide 110, according to some embodiments. The light guide 110 is configured to guide light from a light source (not illustrated in FIGS. 1A-1C) as guided light 104. For example, the light guide 110 may include a dielectric material configured as an optical waveguide. The dielectric material may have a first refractive index that is greater than a second refractive index of a medium surrounding the dielectric optical waveguide. The difference in refractive indices is configured to facilitate total internal reflection of the guided light 104 according to one or more guided modes of the light guide 110, for example.

In some embodiments, the light from the light source is guided as a beam of light 104 along a length of the light guide 110. Further, the light guide 110 may be configured to guide the light (i.e., the guided light beam 104) at a non-zero propagation angle. The guided light beam 104 may be guided at the non-zero propagation angle within the light guide 110 using total internal reflection, for example.

As defined herein, the 'non-zero propagation angle' is an angle relative to a surface (e.g., a top surface or a bottom surface) of the light guide 110. In some examples, the non-zero propagation angle of the guided light beam 104 may be between about ten (10) degrees and about fifty (50) degrees or, in some examples, between about twenty (20) degrees and about forty (40) degrees, or between about twenty-five (25) degrees and about thirty-five (35) degrees. For example, the non-zero propagation angle may be about thirty (30) degrees. In other examples, the non-zero propagation angle may be about 20 degrees, or about 25 degrees, or about 35 degrees.

In some examples, the light from a light source is introduced or coupled into the plate light guide 110 at the non-zero propagation angle (e.g., about 30-35 degrees). One or more of a lens, a mirror or similar reflector (e.g., a tilted collimating reflector), and a prism (not illustrated) may facilitate coupling light into an input end the plate light guide 110 as the beam of light 104 at the non-zero propagation angle, for example. Once coupled into the plate light guide 110, the guided light beam 104 propagates along the plate light guide 110 in a direction that is generally away from the input end (e.g., illustrated by bold arrows pointing along an x-axis in FIGS. 1A-1B). Further, the guided light beam 104 propagates by reflecting or 'bouncing' between the top surface and the bottom surface of the plate light guide 110 at the non-zero propagation angle (e.g., illustrated by an extended, angled arrow representing a light ray of the guided light 104).

Further, the guided light beam 104 produced by coupling light into the plate light guide 110 may be a collimated light beam, according to some examples. In particular, by 'collimated light beam' it is meant that rays of light within the guided light beam 104 are substantially parallel to one another within the guided light beam 104. Rays of light that diverge or are scattered from the collimated light beam of the guided light beam 104 are not considered to be part of the collimated light beam, by definition herein. Collimation of the light to produce the collimated guided light beam 104 may be provided by the lens or mirror (e.g., tilted collimating reflector, etc.) used to couple the light into the plate light guide 110, for example.

In some examples, the plate light guide 110 may be a slab or plate optical waveguide comprising an extended, substantially planar sheet of optically transparent, dielectric material. The substantially planar sheet of dielectric material is configured to guide the guided light beam 104 using total internal reflection. According to various examples, the optically transparent material of the plate light guide 110 may include or be made up of any of a variety of dielectric materials including, but not limited to, one or more of various types of glass (e.g., silica glass, alkali-aluminosilicate glass, borosilicate glass, etc.) and substantially optically transparent plastics or polymers (e.g., poly(methyl methacrylate) or 'acrylic glass', polycarbonate, etc.). In some examples, the plate light guide 110 may further include a cladding layer on at least a portion of a surface (e.g., one or both of the top surface and the bottom surface) of the plate light guide 110 (not illustrated). The cladding layer may be used to further facilitate total internal reflection, according to some examples.

In FIGS. 1A, 1B and 1C, the illustrated 3D electronic display 100 further includes an array of multibeam diffraction gratings 120 arranged in a plurality of offset rows (see FIG. 1C, for example). In some examples, the multibeam diffraction gratings 120 of the array are located at a surface of the plate light guide 110. For example, the multibeam diffraction gratings 120 may be located at a top or front surface of the plate light guide 110, as illustrated in FIGS. 1A-1B. In other examples (not illustrated), the multibeam diffraction grating 120 may be located within the plate light guide 110. In combination, the plate light guide 110 and the array of multibeam diffraction gratings 120 provide or serve as a backlight of the 3D electronic display 100 (i.e., a diffraction grating-based backlight).

According to various embodiments, a multibeam diffraction grating 120 of the array is configured to diffractively couple out a portion of the guided light beam 104 as a plurality of light beams having different principal angular directions corresponding to different views of the 3D electronic display 100. In particular, the portion of the guided light beam 104 is coupled out of the plate light guide 110 by or using diffractive coupling (e.g., also referred to as 'diffractive scattering'). For example, the portion of the guided light beam 104 may be diffractively coupled out by the multibeam diffraction grating 120 through the light guide surface (e.g., through the top surface of the light guide 110). Further, the multibeam diffraction grating 120 is configured to diffractively couple out the portion of the guided light beam 104 as coupled-out light beams (e.g., the light beams 102) and to diffractively redirected the coupled-out light beams 102 away from the plate light guide surface as the plurality of light beams 102. As discussed above, each of the light beams 102 of the plurality has a different predetermined principal angular direction. For example, the light beams 102 of the plurality may be directed away from the plate light guide surface at, in or on (e.g., adjacent to) which the multibeam diffraction grating 120 is located, according to various examples.

In general, the light beams 102 of the plurality produced by the multibeam diffraction grating 120 may be either diverging (e.g., as illustrated) or converging (not illustrated), according to various examples. In particular, FIGS. 1A and 1B illustrate light beams 102 of the plurality that are diverging. Whether the light beams 102 are diverging or converging is determined by a propagation direction of the guided light beam 104 relative to a characteristic of the multibeam diffraction grating 120 (e.g., a 'chirp' direction, as described below). In some examples where the light beams 102 are diverging, the diverging light beams 102 may appear to be diverging from a 'virtual' point (not illustrated) located some distance below or behind the multibeam diffraction grating 120. Similarly, the converging light beams may converge or cross at a virtual point (not illustrated) above or in front of the multibeam diffraction grating 120 (e.g. the plate light guide top or front surface), according to some examples.

According to various embodiments, the multibeam diffraction gratings 120 of the array include a plurality of diffractive features 122 (e.g., illustrated in FIGS. 1A and 1B) that provide diffraction. The provided diffraction is responsible for the diffractive coupling of the portion of the guided light beam 104 out of the plate light guide 110. For example, the multibeam diffraction grating 120 may include one or both of grooves in a surface of the plate light guide 110 and ridges protruding from the plate light guide surface that serve as the diffractive features 122. The grooves and ridges may be arranged parallel to one another and, at least at some point along the diffractive features 122, the grooves and ridges are perpendicular to a propagation direction of the guided light beam 104 that is to be coupled out by the multibeam diffraction grating 120.

In some examples, the grooves or ridges may be etched, milled or molded into the plate light guide surface. As such, a material of the multibeam diffraction gratings 120 may include the material of the plate light guide 110. As illustrated in FIG. 1B, for example, the multibeam diffraction grating 120 includes substantially parallel ridges that protrude from the surface of the plate light guide 110. In FIG. 1A, the multibeam diffraction grating 120 includes substantially parallel grooves 122 that penetrate the surface of the plate light guide 110. In other examples (not illustrated), the multibeam diffraction grating 120 may be a film or layer applied or affixed to the light guide surface.

According to some embodiments, the multibeam diffraction grating 120 may be or comprise a chirped diffraction grating. By definition, the 'chirped' diffraction grating is a diffraction grating exhibiting or having a diffraction spacing of the diffractive features 122 (i.e., a diffraction pitch) that varies across an extent or length of the chirped diffraction grating, e.g., as illustrated in FIGS. 1A-1B. Herein, the varying diffraction spacing is referred to as a 'chirp'. As a result of the chirp, the portion of the guided light beam 104 that is diffractively coupled out of the plate light guide 110 exits or is emitted from the chirped diffraction grating 120 as the coupled-out light beams 102 at different diffraction angles corresponding to different points of origin across the chirped diffraction grating of the multibeam diffraction grating 120. By virtue of a predefined chirp, the chirped diffraction grating is responsible for the predetermined and different principal angular directions of the coupled-out light beams 102 of the light beam plurality.

In some examples, the chirped diffraction grating of the multibeam diffraction grating 120 may have or exhibit a chirp of the diffractive spacing that varies linearly with distance. As such, the chirped diffraction grating may be referred to as a 'linearly chirped' diffraction grating. FIGS. 1A-1B illustrate the multibeam diffraction grating 120 as a linearly chirped diffraction grating, for example. In particular, as illustrated, the diffractive features 122 are closer together at a first end of the multibeam diffraction grating 120 than at a second end. Further, the diffractive spacing of the illustrated diffractive features 122 varies linearly from the first end to the second end, by way of example.

In another example (not illustrated), the chirped diffraction grating of the multibeam diffraction grating 120 may exhibit a non-linear chirp of the diffractive spacing d. Various non-linear chirps that may be used to realize the multibeam diffraction grating 120 include, but are not limited to, an exponential chirp, a logarithmic chirp or a chirp that varies in another, substantially non-uniform or random but still monotonic manner. Non-monotonic chirps such as, but not limited to, a sinusoidal chirp or a triangle or sawtooth chirp, may also be employed. Combinations of any of these types of chirps may also be employed.

In some examples, as mentioned above, the light beams 102 produced by coupling the guided light beam 104 out of the plate light guide 110 using the multibeam diffraction grating 120 may diverge (i.e., be diverging light beams 102), e.g., when the guided light beam 104 propagates in a direction from the first end to the second end of the multibeam diffraction grating 120 (e.g., as illustrated in FIGS. 1A-1B). Alternatively, converging light beams 102 (not illustrated) may be produced when the guided light beam 104 propagates from the second end to the first end of the multibeam diffraction grating 120, according to other examples. In particular, whether the light beams 102 diverge or converge may be determined by a chirp direction relative to a guided beam direction, according to various embodiments.

Figure 2:
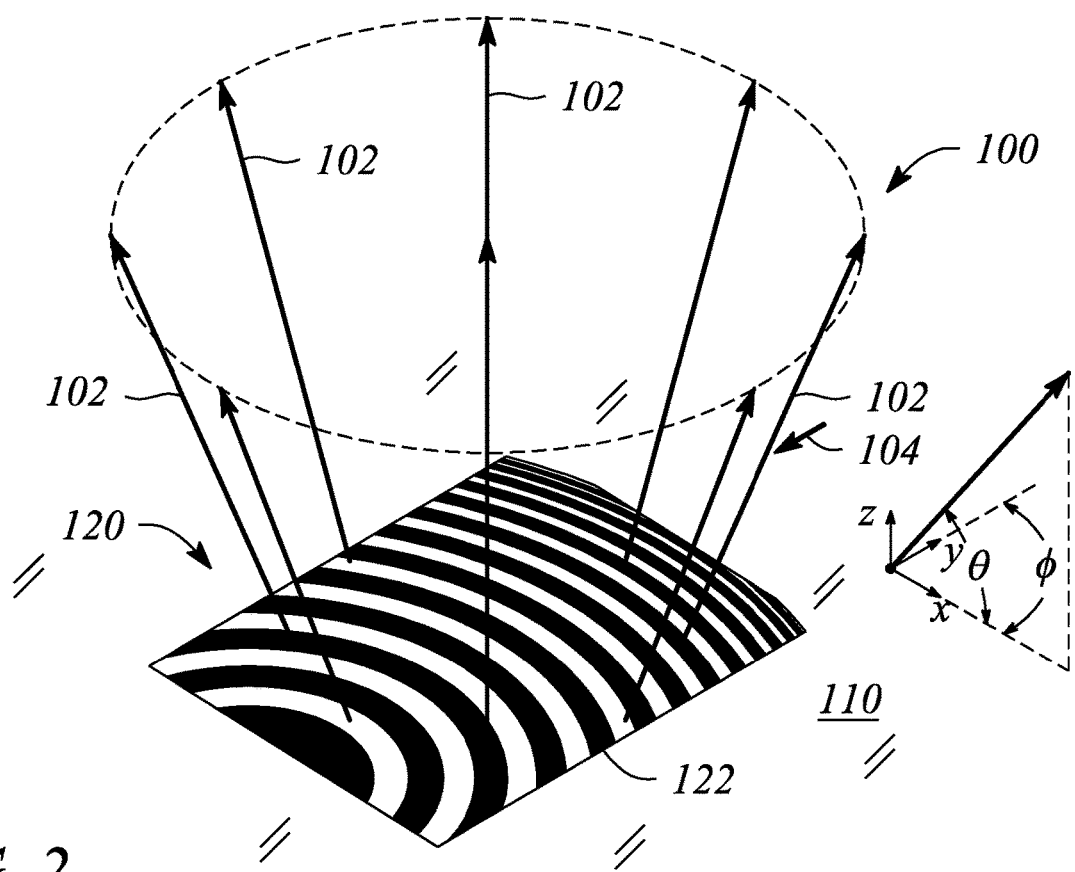
FIG. 2 illustrates a perspective view of a rectangular-shaped, multibeam diffraction grating in an example, according to an embodiment consistent with the principles described herein.

According to some embodiments, the multibeam diffraction grating 120 may comprise diffractive features 122 that are one or both of curved and chirped. Further, the multibeam diffraction grating 120 may have a substantially rectangular shape, according to some embodiments. FIG. 2 illustrates a perspective view of a rectangular-shaped, multibeam diffraction grating 120 in an example, according to an embodiment consistent with the principles described herein. The multibeam diffraction grating 120 illustrated in FIG. 2 also includes diffractive features 122 (e.g., grooves or ridges) in, at or on a surface of the plate light guide 110 that are both curved and chirped (i.e., the multibeam diffraction grating 120 is a curved, chirped diffraction grating). In FIG. 2, the guided light beam 104 has an incident direction relative to the multibeam diffraction grating 120 as illustrated a bold arrow labeled 104. Also illustrated is the plurality of coupled-out or emitted light beams 102 pointing away from the multibeam diffraction grating 120 at the surface of the plate light guide 110. As illustrated, the light beams 102 are emitted in a plurality of predetermined different principal angular directions. In particular, the predetermined different principal angular directions of the emitted light beams 102 are different from one another in both azimuth and elevation, as illustrated. According to various examples, both the predefined chirp of the diffractive features 122 and the curve of the diffractive features 122 may be responsible for the predetermined different principle angular directions of the emitted light beams 102.

Referring again to FIG. 1C, the array of multibeam diffraction gratings 120 may be arranged in a variety of configurations at, on or in the surface of the plate light guide 110, according to various embodiments. In particular, the multibeam diffraction gratings 120 of the array are members of a plurality of gratings arranged in columns and rows across the light guide surface, as illustrated in FIG. 1C. The rows and columns of the multibeam diffraction grating array may represent a rectangular array, for example. Further, as mentioned above, the array of multibeam diffraction gratings 120 comprises rows that are offset from one another (i.e., offset rows). The offset between offset rows is generally in a 'row direction' defined herein as a direction along a row (e.g., an 'x-direction' for a row oriented along an x-axis). According to various examples, this offset along with a spacing between adjacent rows of the multibeam diffraction grating array may facilitate producing a 3D electronic display having an enhanced perceived resolution.

For example, a first row of the multibeam diffraction gratings 120 of the array (i.e., first offset row) may be offset relative to a second row of the multibeam diffraction gratings 120 of the array (i.e., second offset row) adjacent to the first row in a row direction or x-direction of the offset rows. In some embodiments, the offset between the first and second rows (e.g., adjacent rows) may be about one half (½) of a spacing between the multibeam diffraction gratings 120 in a respective row (i.e., ½ pitch) of the array.

FIG. 1C illustrates a first row 124 of multibeam diffraction gratings 120 adjacent to and offset from a second row 126 (e.g., the adjacent rows on either side of the first row 124). Further, the first row 124 is offset from the second row 126 in the row direction (i.e., x-direction) by one half (½) of the pitch P of the array of multibeam diffraction gratings 120 (i.e., P/2), as illustrated. The offset or an offset amount or distance is labeled 'O' in FIG. 1C. FIG. 1C also illustrates rows having a row direction aligned with and an offset direction corresponding to the x-direction. As illustrated therein, the offset O is one half (½) of the pitch P.

In other examples (not illustrated), the offset may include, but is not limited to, one third (⅓) of the multibeam diffraction grating spacing or pitch and one fourth (¼) of the pitch. In some examples (not illustrated), the offset rows may not be directly adjacent. For example, a first pair of directly adjacent rows (e.g., a first row and a second row) may be substantially aligned with one another, while second pair of directly adjacent rows (e.g., a third row and a fourth row) may also be substantially aligned with one another, for example. The first pair of aligned, directly adjacent rows may be offset from the second pair of aligned, directly adjacent rows to yield an array of multibeam diffraction gratings 120 arranged in offset rows, for example.

According to some embodiments, a spacing between adjacent rows (e.g., offset rows) of the multibeam diffraction gratings 120 is less than a pitch of the multibeam diffraction grating array (i.e., a sub-pitch spacing). For example, the spacing between adjacent rows may be about one half (½) of the spacing between, or pitch of, the multibeam diffraction gratings 120 in a row of the array. In particular, FIG. 1C illustrates the first row 124 spaced apart (e.g., a spacing in the y-direction) from the second row 126 by about one half (½) of the pitch P (i.e., P/2). In FIG. 1C, a spacing between rows is labeled 'S' (i.e., S=P/2). In other examples (not illustrated), the spacing between adjacent rows of the multibeam diffraction grating array may be one third (⅓), one fourth (¼), etc., of the pitch. By definition herein, a spacing between adjacent offset rows is defined as a center-to-center spacing between the multibeam diffraction gratings in a first offset row and the multibeam diffraction gratings in a second offset row, wherein the center-to-center spacing is determined from a centerline of each of the first and second offset rows, respectively.

According to various examples, a combination of the offset of rows of the multibeam diffraction grating array and the sub-pitch spacing between adjacent rows may facilitate producing a 3D electronic display having an enhanced perceived resolution. In particular, spatial sub-pixel rendering may be used in conjunction with the combined offset rows and sub-pitch spacing to provide enhanced perceived resolution when compared to a native 3D pixel resolution of the 3D electronic display.

Referring to FIGS. 1A-1C, the 3D electronic display 100 further comprises a light valve array 130. According to various embodiments, the light valve array 130 is configured to modulate the differently directed light beams 102 (i.e., the plurality of light beams 102 having different predetermined angular directions) corresponding to the different views of the 3D electronic display. In particular, the light beams 102 of the light beam plurality pass though and are modulated by individual light valves 132 of the light valve array 130. The modulated, differently direct light beams 102 may represent pixels of the 3D electronic display, according to various embodiments. In various examples, different types of light valves 132 may be employed in the light valve array 130 including, but not limited to, one or more of liquid crystal light valves, electrophoretic light valves, and light valves based on electrowetting.

In some embodiments, a subset of light valves 132 of the light valve array 130 is configured to modulate the differently directed light beams 102 from a selected one of the multibeam diffraction gratings 120 of the multibeam diffraction grating array. The subset is defined herein as a 'super-pixel' of the 3D electronic display 100. In these embodiments, each light valve 132 of the super-pixel (or subset) may be configured to modulate a different one of the plurality of differently directed light beams 102 coupled out by the selected multibeam diffraction grating. For example, in FIGS. 1A and 1B, separate arrows representing separate light beams 102 are illustrated as passing through separate light valves 132 of the light valve array 130. Also, a dashed line box delineates an example super-pixel in FIG. 1C.

In some embodiments (e.g., as illustrated in FIG. 1C), the super-pixel comprises a rectangular arrangement of the light valves 132. Further, the rectangular light valve arrangement of the super-pixel may have fewer light valves in a second direction than in a first direction substantially orthogonal to the second direction. For example, in FIG. 1C there are about half as many light valves 132 in a direction orthogonal to a row direction (e.g., the second or y-direction) of the offset rows of the multibeam diffraction grating array than in the row direction (e.g., the first or x-direction). As illustrated in FIG. 1C by way of example and not limitation, there are four (4) light valves 132 in the y-direction and eight (8) light valves in the x-direction direction. Note that, while having fewer light valves 132 in the second direction may reduce a number of 3D views in that direction when compared to the second direction, such a reduction may be acceptable in many applications of the 3D electronic display 100.

For example, many display applications may benefit from a large number of 3D views in a horizontal direction (e.g., x-direction). On the other hand, a fewer number of 3D views in a vertical direction (e.g., y-direction) may not significantly degrade or even affect the ability of the 3D electronic display 100 to present a realistic rendition of 3D information, in many applications. In particular, eyes of a user viewing the 3D electronic display are displaced from one another in a horizontal plane (e.g., as opposed to a vertical plane). As such, the user is much more sensitive to 3D information in the horizontal plane. Embodiments of the 3D electronic display 100 having a larger number of 3D views in the horizontal direction as compared to the vertical direction (e.g., as may be provided by the aforementioned rectangular super-pixel) may still be able to present high quality 3D information to the user.

Figure 3A:
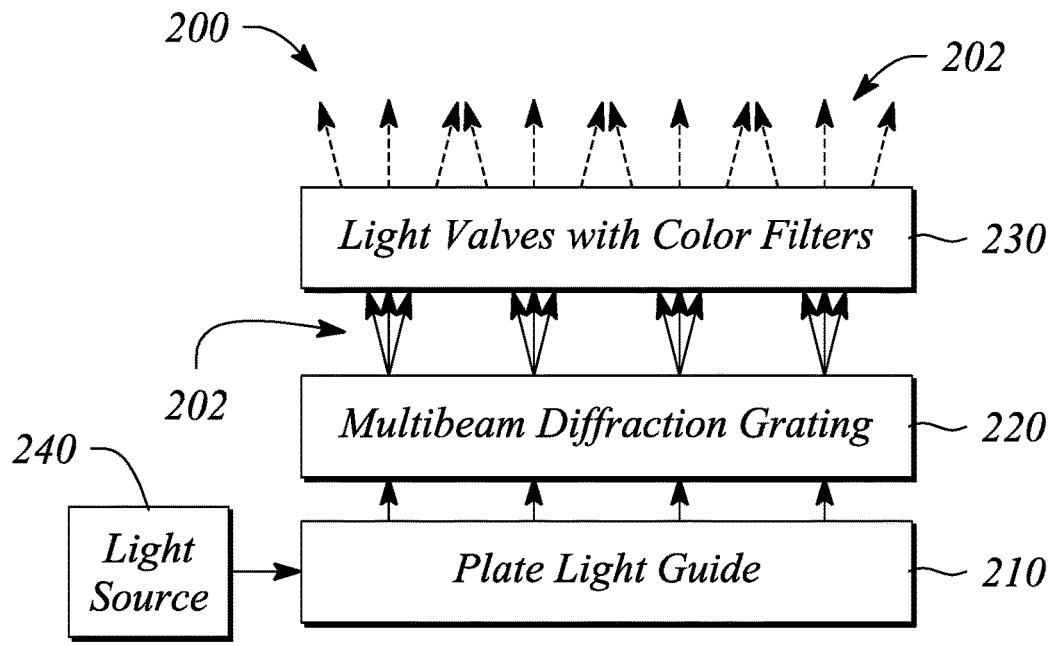
FIG. 3A illustrates a block diagram of a three-dimensional (3D) color electronic display in an example, according to an embodiment of the principles described herein.
Figure 3B:
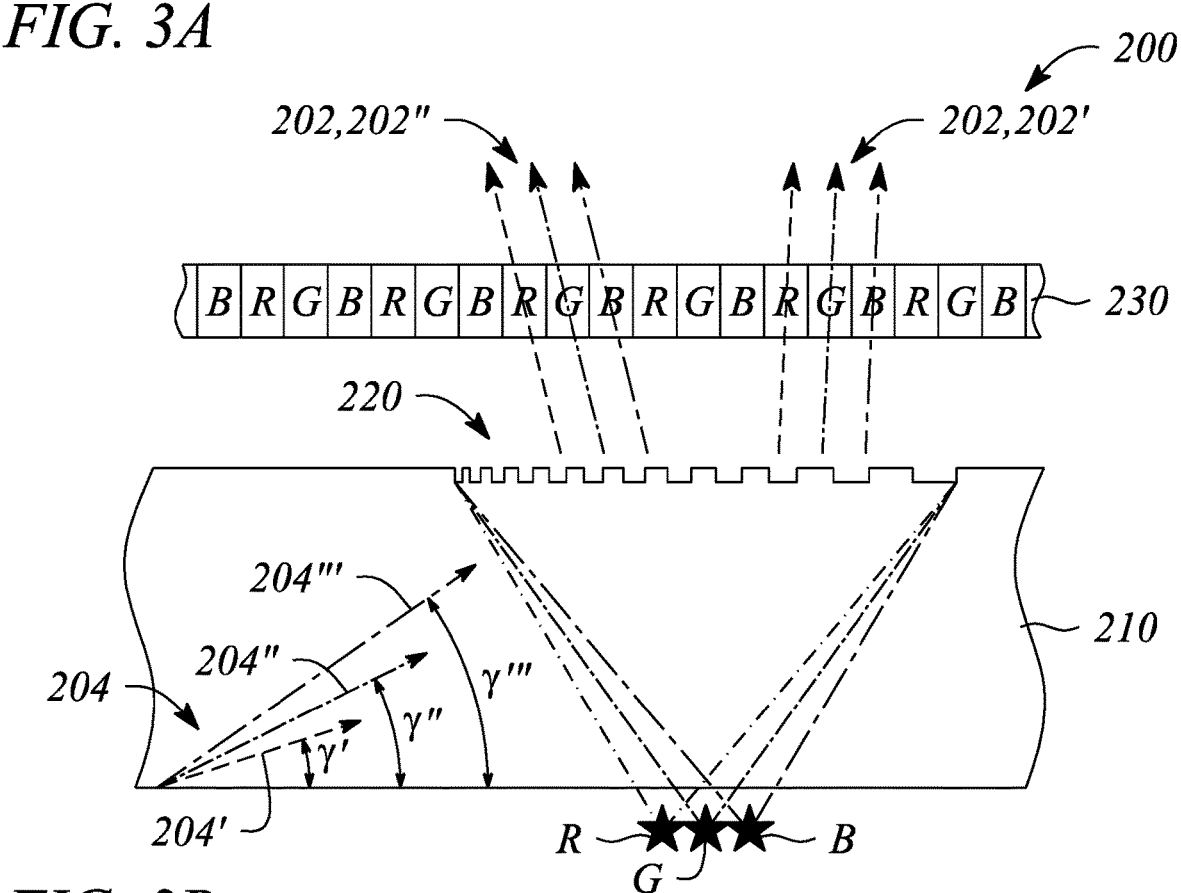
FIG. 3B illustrates a cross sectional view of a three-dimensional (3D) color electronic display in an example, according to an embodiment of the principles described herein.

According to some examples of the principles described herein, a three-dimensional (3D) color electronic display is provided. FIG. 3A illustrates a block diagram of a three-dimensional (3D) color electronic display 200 in an example, according to an embodiment of the principles described herein. FIG. 3B illustrates a cross sectional view of a portion of a three-dimensional (3D) color electronic display 200 in an example, according to an embodiment of the principles described herein. For example, FIG. 3B may illustrate a portion of the 3D color electronic display 200 illustrated in FIG. 3A.

The 3D color electronic display 200 is configured to produce modulated, directional light comprising light beams having different principal angular directions and in a plurality of different colors. For example, the 3D color electronic display 200 may provide or generate a plurality of different color light beams 202 directed out and away from the 3D color electronic display 200 in different predetermined principal angular directions (e.g., as a color light field). In turn, the color light beams 202 of the plurality may be modulated to facilitate the display of information including color.

In some examples, the modulated light beams 202 having different predetermined principal angular directions and different colors form a plurality of color pixels of the 3D color electronic display 200. In some examples, the 3D color electronic display 200 may be a so-called 'glasses free' 3D color electronic display (e.g., a color multiview, 'holographic' or autostereoscopic display) in which the color light beams 202 correspond to color pixels associated with different 'views' of the 3D color electronic display 200. For example, as illustrated in FIG. 3B, a first set of the color light beams 202' may be directed in a first direction to represent or correspond to a first view of the 3D color electronic display 200, while a second set of the color light beams 202" may be directed in a second direction to represent or correspond to a second view of the 3D color electronic display 200. The first and second sets of color light beams 202', 202" may each represent red, green and blue, of an RGB color model or color space, as illustrated in FIG. 3B by way of example and not limitation. As such, the 3D color electronic display 200 may be substantially similar to the 3D electronic display 100, described above, with the addition of the ability to represent color information. Moreover, the color light beams 202 may be substantially similar to the light beams 102 described above with respect to the 3D electronic display 100, with the addition that various ones of the color light beams 202 may have or represent different colors from one another (e.g., red, green or blue) and sets of the different colors are co-directed in directions corresponding to the different views of the 3D color electronic display 200.

As illustrated in FIGS. 3A-3B, the 3D color electronic display 200 comprises a plate light guide 210. The plate light guide 210 is configured to guide light beams 204 of different colors. For example, the different colors of the guided light beams 204 may comprise the colors red, green and blue of a red-green-blue (RGB) color model. Further, the plate light guide 210 is configured to guide the different color light beams 204 at different color-dependent propagation angles within the plate light guide. As illustrated in FIG. 3B, a first guided color light beam 204' (e.g., a red light beam) may be guided at a first color-dependent propagation angle $\gamma'$, a second guided color light beam 204" (e.g., a green light beam) may be guided at a color-dependent second propagation angle $\gamma''$, and a third guided color light beam 204'''

(e.g., a blue light beam) may be guided at a third color-dependent propagation angle γ".

Aside from being configured to guide different color light beams 204, the plate light guide 210 may be substantially similar to the plate light guide 110 described above with respect to the 3D electronic display 100. For example, the plate light guide 210 may be a slab optical waveguide that is a planar sheet of dielectric material configured to guide light by total internal reflection. Further, according to some examples, the guided color light beams 204 within the plate light guide 210 may be collimated light beams (i.e., collimated color light beams), as described above with respect to the 3D electronic display 100.

The 3D color electronic display 200 illustrated in FIGS. 3A and 3B further comprises a multibeam diffraction grating 220. According to some embodiments, the multibeam diffraction grating 220 may be at or adjacent to a surface of the plate light guide 210 (e.g., a front or top surface). The multibeam diffraction grating 220 is configured to couple out a portion of each of the different color guided light beams 204 as a separate plurality of coupled-out light beams of the respective different color (i.e., the different color light beams 202). For example, there may be a separate plurality of coupled-out color light beams 202 for each of the different colors of the guided color light beams 204. According to various embodiments, the respective coupled out light beams 202 of the separate pluralities have different principal angular directions representing different views of the 3D color electronic display. For example, a 3D color electronic display view may be represented by a set of coupled-out light beams 202 (e.g., the set of light beams 202' or 202") directed in or having substantially the same principal angular direction, in which different coupled-out light beams 202 of the set correspond to each of the different colors of the guided color light beams 204. In combination, the plate light guide 210 and the multibeam diffraction grating 220 provide or serve as a backlight of the 3D color electronic display 200 (i.e., a diffraction grating-based backlight).

According to some embodiments, the multibeam diffraction grating 220 may be substantially similar to the multibeam diffraction grating 120, described above with respect to the 3D electronic display 100. For example, the multibeam diffraction grating 220 may have a substantially rectangular shape with diffractive features comprising one or both of curved grooves in the plate light guide surface and curved ridges on the plate light guide surface (i.e., continuously curved or piece-wise curved). Further, the diffractive features, whether curved or not, may be spaced apart from one another by a spacing between the diffractive features that varies as a function of distance across the multibeam diffraction grating 220 (e.g., a 'chirped' spacing). That is, the multibeam diffraction grating 220 may comprise a chirped diffraction grating, e.g., one or more of a linear chirped diffraction grating, a non-linear chirped diffraction grating, etc., as described above for the multibeam diffraction grating 120.

Further, in some embodiments, the multibeam diffraction grating 220 may be a member of an array of multibeam diffraction gratings substantially similar to the array of multibeam diffraction gratings 120 of the 3D electronic display 100, as described above. In particular, the array of multibeam diffraction gratings 220 of the 3D color electronic display 200 may be arranged in a plurality of offset rows. In some embodiments, adjacent rows of the multibeam diffraction gratings 220 of the array may be offset from one another by about one half (½) of a distance, in a row direction, between the multibeam diffraction gratings (i.e., the pitch) in the offset rows. In other examples, another offset may be used including, but not limited to, one third (⅓), one fourth (¼), or etc., of the pitch. Further, in some examples, a spacing between the offset rows of the multibeam diffraction gratings 220 of the array is about one half of the spacing between, or pitch of, the multibeam diffraction gratings 220 in the offset rows. In other examples, the spacing may include, but is not limited to, one third (⅓), one fourth (¼), or etc., of the pitch.

As illustrated in FIGS. 3A-3B, the 3D color electronic display 200 further comprises a plurality of light valves 230. According to various embodiments, the plurality of light valves 230 are configured to modulate the coupled-out light beams 202 of the different colors in the separate coupled-out light beam pluralities. Further, according to various embodiments, the light valves 230 of the light valve plurality comprise color filters corresponding to the different colors of the coupled-out light beams 202. In particular, a first light valve 230 of the light valve plurality may have a color filter corresponding to a first color of the different colors; a second light valve 230 of the plurality may have a color filter corresponding to a second color; and so on for the different colors of the coupled-out light beams 202 (e.g., or equivalently of the different color guided light beams 204). For example, the color filters of the plurality of light valves 230 may include a red color filter, a green color filter and a blue color filter corresponding to the RGB color model. Using color filters (e.g., red, green, blue) may facilitate displaying color images and other information without sequentially modulating light different color guided light beams 204, for example.

In various examples, different types of light valves may be employed in the plurality of light valves 230 including, but not limited to, one or more of liquid crystal light valves, electrowetting light valves, and electrophoretic light valves. For example, the light valve plurality may be a liquid crystal light valve array (e.g., a commercial liquid crystal light valve array) in which 'pixels' of the liquid crystal light valve array comprise sub-cells or subpixels' corresponding to each the different colors (e.g., RGB subpixels). According to some embodiments, the plurality of light valves 230 may be substantially similar to the light valves of the light valve array 130, described above with respect to the 3D electronic display 100.

According to various embodiments, the color-dependent propagation angles of the different color guided light beams 204 result in different principal angular directions of the coupled-out light beams 202 corresponding to the respective different colors. In particular, due to the different color-dependent propagation angles, the coupled-out light beams 202 corresponding to a particular color (e.g., red, green or blue) may appear to be emanating from a color-dependent virtual point source. In FIG. 3B, color-dependent virtual point sources are illustrated as stars, for simplicity of illustration only, and labeled 'R', 'G' and 'B' to correspond to the colors 'red', 'green' and 'blue', for example. Dashed lines emanating from respective ones of the color-dependent virtual point sources illustrate a span of virtual light beams for each color (i.e., virtual span of light beams). In particular, each virtual point source has a span that extends to opposite ends of the multibeam diffraction grating 220, for example. Moreover, the different color-dependent virtual point sources are laterally displaced from one another as a result of the different color-dependent propagation angles of the guided light beams 204.

Due to the different color-dependent propagation angles of the guided light beams 204, a coupled-out light beam 202 corresponding to a first color may exit the multibeam diffraction grating 220 with a principal angular direction such that the first color coupled-out light beam 202 is preferentially directed through and thus modulated by a light valve 230 having a color filter corresponding to the first color. Similarly, a coupled-out light beam 202 corresponding to a second color may exit the multibeam diffraction grating 220 with a principal angular direction such that the second color coupled-out light beam 202 is modulated by another light valve 230 having a color filter of the second color. As a result, the light valves 230 having color filters of the first color may be configured to preferentially receive and modulate coupled-out light beams 202 of the first color. Similarly, the light valves 230 having color filters of the second color may be configured to preferentially receive and modulate coupled-out light beams 202 of the second color, and so on.

According to some embodiments (e.g., as illustrated in FIG. 3A), the 3D color electronic display 200 may further include a light source 240. The light source 240 is configured to provide light that propagates in the plate light guide 210 as the different color guided light beams 204. In particular, the guided light is light from the light source 240 that is coupled into the edge (or input end) of the plate light guide 210, according to some embodiments. For example, a lens, a collimating reflector or similar device (not illustrated) may facilitate coupling of light into the plate light guide 110 at the input end or edge thereof. In various examples, the light source 240 may comprise substantially any source of light including, but not limited to, one or more of a light emitting diode (LED) and any of the light sources described herein. In some examples, the light source 240 may comprise an optical emitter configured produce a substantially monochromatic light having a narrowband spectrum denoted by a particular color. In particular, the color of the monochromatic light may be a primary color of a particular color space or color model (e.g., a red-green-blue (RGB) color model).

In various embodiments, the light source 240 has a plurality of optical emitters coupled to the plate light guide 210 to provide the guided light beams 204 of the different colors. In particular, different ones of the optical emitters may be configured to provide a different color of light corresponding to the different colors of the guided light beams 204. Further, the optical emitters may be laterally offset or displaced from one another (e.g., in a direction corresponding to an overall propagation direction of emitted light). According to various embodiments, the lateral displacement of the optical emitters may be configured to determine the color-dependent propagation angles of the light beams 204 corresponding to the different colors of light produced by the optical emitters of the light source 240.

According to some examples of the principles described herein, a method of 3D electronic display operation is provided. In particular, the method of 3D electronic display operation may be used to display 3D information. Further, the 3D information may be displayed with enhanced perceived resolution, according to various embodiments of the method of 3D electronic display operation.

Figure 4:
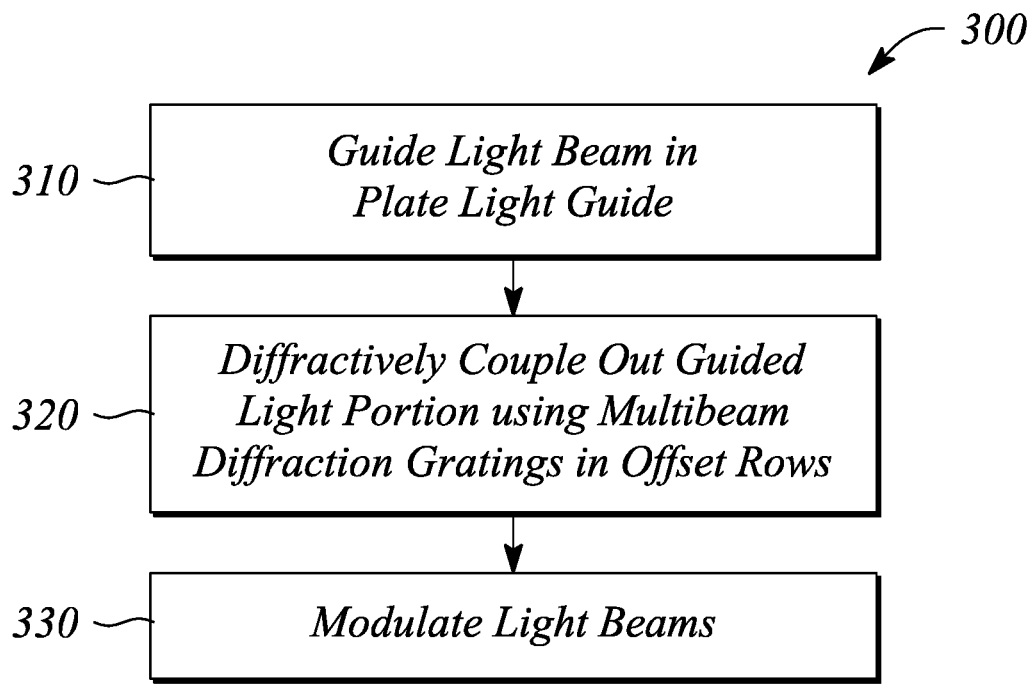
FIG. 4 illustrates a flow chart of a method of three-dimensional (3D) electronic display operation in an example, according to an embodiment consistent with the principles described herein.

FIG. 4 illustrates a flow chart of a method 300 of 3D electronic display operation in an example, according to an embodiment consistent with the principles described herein. As illustrated in FIG. 4, the method 300 of 3D electronic display operation comprises guiding 310 light in a plate light guide as a light beam at a non-zero propagation angle. In some examples, the plate light guide and the guided light may be substantially similar to the plate light guide 110 and the guided light beam 104, described above with respect to the 3D electronic display 100. In particular, the plate light guide guides 310 the guided light beam according to total internal reflection and, in some examples, the guided light beam may be collimated. Further, the plate light guide may be a substantially planar dielectric optical waveguide or slab waveguide (e.g., a planar dielectric sheet), according to some embodiments.

As illustrated in FIG. 4, the method 300 of 3D electronic display operation further comprises diffractively coupling out 320 a portion of the guided light beam using an array of multibeam diffraction gratings arranged in offset rows. According to various embodiments, the portion of the guided light beam that is diffractively coupled out 320 of the plate light guide includes a plurality of light beams that are directed away from a surface of the plate light guide in a plurality of different principal angular directions (also referred to herein as 'differently directed light beams' and 'coupled-out light beams'). In particular, in various embodiments, a light beam of the light beam plurality that is directed away from the plate light guide surface has a different principal angular direction from other light beams of the light beam plurality. Further, the plurality of different principal angular directions of the plurality of light beams corresponds to different views of the 3D electronic display, according to various embodiments.

In some embodiments, diffractively coupling out 320 a portion of the guided light uses or employs the array of multibeam diffraction grating located at or adjacent to a surface of the plate light guide. For example, the multibeam diffraction gratings of the array may be formed on or in the surface (e.g. a top surface) of the plate light guide as grooves, ridges, etc., and may be formed of a material of the plate light guide. In other examples, the multibeam diffraction gratings of the array may include a film on the plate light guide surface.

In some examples, the array of multibeam diffraction gratings are substantially similar to the array of multibeam diffraction gratings 120 described above with respect to 3D electronic display 100. For example, a first row of the multibeam diffraction gratings of the array may be offset in a row direction relative to a second row of the multibeam diffraction grating array adjacent to the first row. Further, for example, the offset may be about one half (½) of a spacing between, or a pitch of, the multibeam diffraction gratings in an offset row of the array. In some examples, a spacing between adjacent offset rows of the multibeam diffraction grating array is about one half (½) of the multibeam diffraction grating spacing or pitch in the offset row. A combination of the one-half (½) spacing offset of the adjacent offset rows and the one-half spacing between adjacent offset rows of the multibeam diffraction grating array, for example, may facilitate providing an enhanced perceived resolution of about two (2) times a physical or actual pixel resolution of the 3D electronic display, according to some embodiments.

The method 300 of 3D electronic display operation illustrated in FIG. 4 further includes modulating 330 the plurality of coupled-out light beams using a plurality of light valves. The modulated, differently directed light beams coupled out 320 by the multibeam diffraction grating may represent pixels of the 3D electronic display, for example. According to some examples, the plurality of light valves may be substantially similar to the light valve array 130 described above with respect to the 3D electronic display 100. For example, the plurality of light valves may include a plurality of liquid crystal light valves, or a plurality of electrowetting light valves, or a plurality of electrophoretic light valves, etc., or any combination thereof.

In some embodiments, modulating 330 the light beams comprises modulating the differently directed light beams from a selected multibeam diffraction grating of the array using a subset of the light valves. In these embodiments, the differently directed light beams modulated by the light valve subset represent a super-pixel of the 3D electronic display. Further, each light valve of the subset modulates a different one of the plurality of differently directed light beams of the selected multibeam diffraction grating. In some embodiments, the super-pixel may comprise a rectangular arrangement of the light valves. In some embodiments, the rectangular arrangement of the light valves of the super-pixel may have about half as many light valves in a direction orthogonal to a row direction of the offset rows of the multibeam diffraction grating array than in the row direction, i.e., a number of light valves in the row direction may be twice a number of light valves in a direction orthogonal to the row direction.

According to some examples of the principles described herein, a method of 3D color electronic display operation is provided. In particular, the method of 3D color electronic display operation may be used to display 3D information that includes color content. For example, the 3D information may include color content represented by a color space or gamut. According to various embodiments, the method of 3D color electronic display operation facilitates using a spatially multiplexed color, space, scheme or gamut that employs light valves with color filters.

Figure 5:
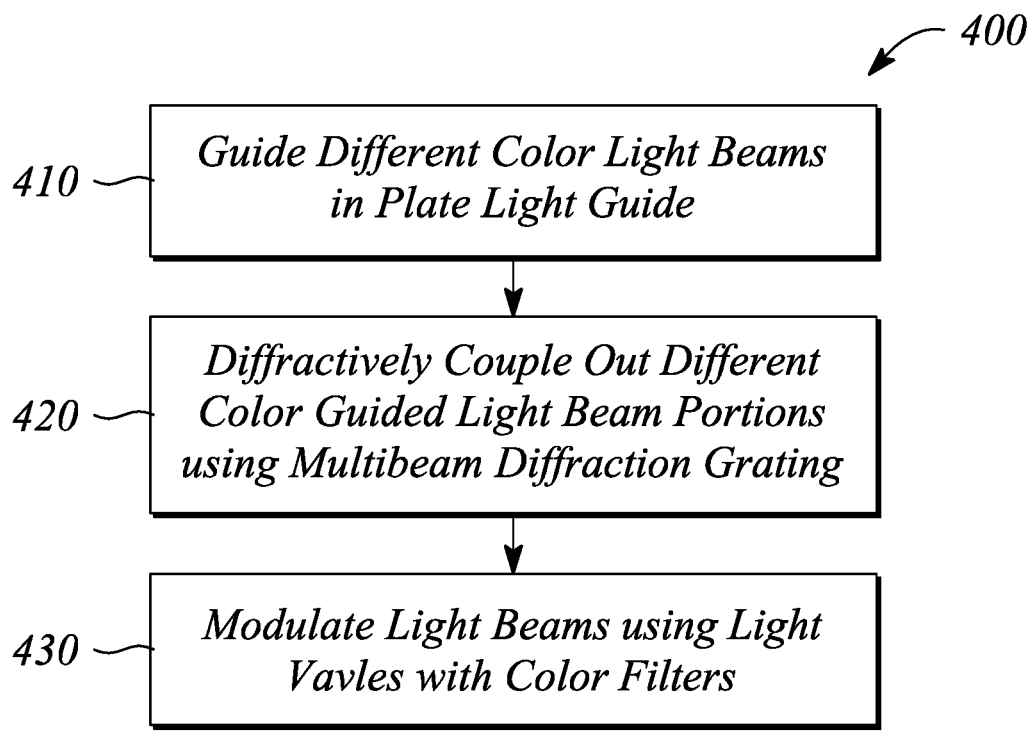
FIG. 5 illustrates a flow chart of a method of three-dimensional (3D) color electronic display operation in an example, according to an embodiment consistent with the principles described herein.

FIG. 5 illustrates a flow chart of a method 400 of 3D color electronic display operation in an example, according to an embodiment consistent with the principles described herein. As illustrated in FIG. 5, the method 400 of 3D electronic display operation comprises guiding 410 light in a plate light guide, wherein the light comprises a plurality of light beams of different colors. Further, guiding 410 light comprises guiding the different color light beams at respective different color-dependent propagation angles (i.e., non-zero, color-dependent propagation angles), according to various embodiments. In some examples, the plate light guide and the different color guided light beams may be substantially similar to the plate light guide 210 and the different color guided light beams 204, described above with respect to the 3D color electronic display 200. In particular, the plate light guide guides 410 the guided light beam according to total internal reflection and, in some examples, the guided light beam may be collimated. Further, the plate light guide may be a substantially planar dielectric optical waveguide or slab waveguide (e.g., a planar dielectric sheet), in some embodiments.

As illustrated in FIG. 5, the method 300 of 3D color electronic display operation further comprises diffractively coupling out 420 a portion of each of the different color guided light beams using a multibeam diffraction grating. According to various embodiments, the portions of the respective different color guided light beams are diffractively coupled out 420 as separate pluralities of coupled-out light beams that are directed away from a surface of the plate light guide. Further, coupled-out light beams of the separate pluralities have different principal angular directions representing different views of the 3D color electronic display. The coupled-out light beams are also referred to as the 'differently directed light beams' herein. In some examples, the multibeam diffraction grating used in diffractively coupling out 420 is substantially similar to the multibeam diffraction grating 220 described above with respect to 3D color electronic display 200.

In particular, the multibeam diffraction grating 220 may be located at or adjacent to a surface of the plate light guide, for example. In some examples, the multibeam diffraction grating may be formed on or in the surface (e.g. a top surface) of the plate light guide as grooves, ridges, etc., and may be formed of a material of the plate light guide. In other examples, the multibeam diffraction grating may include a film on the plate light guide surface.

In some embodiments, the multibeam diffraction grating used in diffractively coupling out 420 a portion of the different color guided light beams is a member of an array of multibeam diffraction gratings. In some embodiments, a first row of the array of multibeam diffraction gratings may be offset in a row direction of the array relative to a second row adjacent to the first row of the array of multibeam diffraction gratings. Further, for example, the offset may be about one half (½) of a spacing between, or a pitch of, the multibeam diffraction gratings in an offset row. In some examples, a spacing between adjacent rows of the array of multibeam diffraction gratings is about one half (½) of the multibeam diffraction grating spacing or pitch in the offset row. A combination of the one-half (½) spacing offset of the adjacent offset rows and the one-half spacing between adjacent offset rows, for example, may facilitate providing an enhanced perceived resolution of about two (2) times a physical or actual pixel resolution of the 3D color electronic display, according to some embodiments.

According to some examples, the method 400 of 3D color electronic display operation further includes modulating 430 the separate pluralities of coupled-out light beams of different colors using an array of light valves. Light valves of the array comprise color filters corresponding to the different colors of the coupled-out light beams in the respective separate pluralities, according to various embodiments. Moreover, the light valves in the light valve array are arranged to correspond to the different predetermined principal angular directions of the coupled-out light beams in the respective separate pluralities. The differently directed light beams that are modulated 430 using the color filter equipped light valves of the light valve array may represent color pixels of the 3D electronic display.

According to some examples, the array of light valves may be substantially similar to the light valve plurality 230 described above with respect to the 3D color electronic display 200. For example, the plurality of light valves may include a plurality of liquid crystal light valves, or a plurality of electrowetting light valves, or a plurality of electrophoretic light valves, etc., or any combination thereof. Further, the different light valves of the plurality may include color filters corresponding to each of the different colors of the different color light beams that are guided 410 within the plate light guide, for example. In particular, in some embodiments, the different colors of the guided 410 light beams comprise red, green and blue of a red-green-blue (RGB) color model. In these embodiments, the color filters may include a red color filter, a green color filter, and a blue color filter corresponding to the RGB color model.

Thus, there have been described examples of a 3D electronic display, a 3D color electronic display, a method of 3D electronic display operation, and a method of 3D color electronic display operation that employ one or both of an array of multibeam diffraction gratings arranged in offset rows and light valves having color filters. It should be understood that the above-described examples are merely illustrative of some of the many specific examples that represent the principles described herein. Clearly, those skilled in the art can readily devise numerous other arrangements without departing from the scope as defined by the following claims.

What is claimed is:

1. A three-dimensional (3D) electronic display comprising:
   a plate light guide configured to guide a light beam at a non-zero propagation angle;
   an array of multibeam diffraction gratings arranged in a plurality of offset rows, a multibeam diffraction grating of the array being configured to diffractively couple out a portion of the guided light beam as a plurality of coupled-out light beams having different principal angular directions corresponding to different views of the 3D electronic display, a center-to-center spacing between alternating offset rows of the multibeam diffraction grating array being offset by a one half, one third, or one quarter pitch of the multibeam diffraction gratings in the offset rows of the multibeam diffraction grating array; and
   a light valve array configured to modulate the plurality of coupled-out light beams corresponding to the different views of the 3D electronic display, the modulated light beams representing pixels of the 3D electronic display.

2. The 3D electronic display of claim 1, wherein the multibeam diffraction grating comprises a linearly chirped diffraction grating.

3. The 3D electronic display of claim 1, wherein the multibeam diffraction grating is at a surface of the plate light guide, the multibeam diffraction grating having a substantially rectangular shape with diffractive features comprising one or both of curved grooves in the plate light guide surface and curved ridges on the plate light guide surface.

4. The 3D electronic display of claim 1, wherein a first row of the multibeam diffraction grating array is offset in a row direction relative to a second row of the multibeam diffraction grating array adjacent to the first row, the offset being about one half of a pitch of the multibeam diffraction gratings in the first row of the multibeam diffraction grating array.

5. The 3D electronic display of claim 1, wherein a subset of the light valves of the light valve array is configured to modulate the plurality of coupled-out light beams from a selected multibeam diffraction grating of the multibeam diffraction grating array, the light valve subset representing a super-pixel of the 3D electronic display, each light valve of the super-pixel being configured to modulate a different coupled-out light beam of the selected multibeam diffraction grating.

6. The 3D electronic display of claim 5, wherein the super-pixel comprises a rectangular arrangement of the light valves of the subset, the rectangular arrangement having about half as many light valves in a direction substantially orthogonal to a row direction of the plurality of offset rows of the multibeam diffraction grating array than in a the row direction.

7. The 3D electronic display of claim 1, further comprising a plurality of light sources of different colors both laterally displaced from one another in a row direction of the offset rows of the multibeam diffraction grating array and coupled to the plate light guide, each light source being configured to produce a light beam of a specific color different from the colors produced by other light sources of the light source plurality, wherein the plate light guide is configured to guide the different color light beams at respective non-zero propagation angles determined by the lateral displacement of the different color light sources, wherein the respective non-zero propagation angles of the different color guided light beams is configured to provide coupled-out light beams of each of the different colors in each of the different views of the 3D electronic display.

8. The 3D electronic display of claim 7, wherein the light valves of the light valve array comprise liquid crystal light valves, a first liquid crystal light valve having a color filter that differs in color from a color filter of a second liquid crystal light valve of the light valve array.

9. A method of 3D electronic display operation, the method comprising:
   guiding light in a plate light guide as a light beam at a non-zero propagation angle;
   diffractively coupling out a portion of the guided light beam using an array of multibeam diffraction gratings arranged in offset rows on the plate light guide, a center-to-center spacing between alternating offset rows of the multibeam diffraction grating array being offset by a one half, one third, or one quarter pitch of the multibeam diffraction gratings in the offset rows of the multibeam diffraction grating array, wherein diffractively coupling out the guided light beam portion comprises producing a plurality of coupled-out light beams that are directed away from the plate light guide in a plurality of different principal angular directions corresponding to different views of the 3D electronic display; and
   modulating the plurality of coupled-out light beams using a plurality of light valves, the modulated light beams representing pixels of the 3D electronic display.

10. The method of 3D electronic display operation of claim 9, wherein a first row of the multibeam diffraction gratings of the array is offset in a row direction relative to a second row adjacent to the first row, the offset being about one half of a pitch of the multibeam diffraction gratings in the offset rows.

11. The method of 3D electronic display operation of claim 9, wherein modulating the plurality of coupled-out light beams comprises modulating differently directed light beams coupled out by a selected multibeam diffraction grating of the array using a subset of the light valves of the light valve plurality, the differently directed light beams modulated by the light valve subset representing a super-pixel of the 3D electronic display, each light valve of the subset modulating a different light beam of the differently directed light beams of the selected multibeam diffraction grating, and wherein the super-pixel comprises a rectangular arrangement of the light valves in the subset, the rectangular arrangement having about twice as many light valves in a row direction of the offset rows of the multibeam diffraction grating array than in a direction substantially perpendicular to the row direction.

12. The method of 3D electronic display operation of claim 9, further comprising generating a plurality of different color light beams using a plurality of different color optical emitters, each different color light beam of the light beam plurality being guided within the plate light guide at a different color-dependent non-zero propagation angle.

13. The 3D electronic display of claim 1, wherein a multibeam diffraction grating of the array comprises a first grating region having first diffractive features and a second grating region having second diffractive features, the first and second diffractive features differing in at least one of feature spacing or feature orientation.

* * * * *